United States Patent [19]

Danckert

[11] 4,073,357

[45] Feb. 14, 1978

[54] VEHICLE WITH ENERGY ABSORBING CHASSIS AND ENGINE RESTRAINT

[75] Inventor: Hermann Danckert, Wolfsburg, Germany

[73] Assignee: Volkswagenwerk Aktiengesellschaft, Germany

[21] Appl. No.: 654,055

[22] Filed: Jan. 30, 1976

[30] Foreign Application Priority Data

Feb. 14, 1975 Germany .............................. 2506303

[51] Int. Cl.² .............................................. B60K 5/12
[52] U.S. Cl. ............................ 180/64 R; 180/103 A; 180/82 R; 280/106 R
[58] Field of Search .................. 180/82 R, 91, 103 A, 180/64 R, 64 L, 89.1

[56] References Cited

U.S. PATENT DOCUMENTS

| | | | |
|---|---|---|---|
| 3,347,501 | 10/1967 | Eimeren | 180/64 R X |
| 3,589,466 | 6/1971 | Dudley | 180/82 R |
| 3,638,748 | 2/1972 | Tixier | 180/64 R |
| 3,774,712 | 11/1973 | Froumasou | 180/82 R |
| 3,815,703 | 6/1974 | Delorean | 180/91 |
| 3,827,525 | 8/1974 | Felzer | 180/82 R |
| 3,851,722 | 12/1974 | Grosseau | 180/64 R X |
| 3,869,017 | 3/1975 | Feustel | 180/64 R X |
| 3,879,073 | 4/1975 | Norlin | 180/82 R X |
| 3,955,640 | 5/1976 | Yamanaka | 180/91 |

FOREIGN PATENT DOCUMENTS

| | | |
|---|---|---|
| 1,780,435 | 2/1972 | Germany. |
| 2,056,102 | 5/1972 | Germany. |
| 2,213,725 | 11/1972 | Germany. |
| 2,241,651 | 3/1974 | Germany. |

*Primary Examiner*—Joseph F. Peters, Jr.
*Assistant Examiner*—John P. Silverstrim
*Attorney, Agent, or Firm*—Brumbaugh, Graves, Donohue & Raymond

[57] ABSTRACT

A vehicle with energy absorbing chassis members has an engine unit attached to the chassis by severable mounts. Restraining means are provided to impede the forward motion of the engine unit on the occurrence of an accident. The restraining means enter into force transmitting connection with the engine unit only after the severance of the engine mounts.

2 Claims, 1 Drawing Figure

VEHICLE WITH ENERGY ABSORBING CHASSIS AND ENGINE RESTRAINT

BACKGROUND OF THE INVENTION

This invention relates to vehicles having front mounted engines and in particular to such vehicles as are provided with means for restraining the forward motion of the engine in the event the engine is severed from the chassis on the occurrence of a frontal collision.

When a vehicle equipped with a front mounted engine is involved in a frontal accident above a predetermined vehicle speed, the mountings of the engine and transmission unit are often released from the chassis of the vehicle. These mounting units are generally comparatively soft to prevent the transmission of engine vibrations from the engine and transmission unit to the chassis of the vehicle during normal engine operation. On the release of these mountings from the chassis, the engine unit with the transmission moves at a substantially undiminished velocity toward the front of the vehicle.

It has previously been considered that the release of the engine and transmission unit from the chassis of the vehicle was unobjectionable or even desirable. It was previously felt that this spearation resulted in protection of the passenger compartment and therefore the vehicle occupants in the compartment against dangerous deceleration, since a large amount of kinetic energy remained with the engine/transmission unit which was projected forward.

Investigations have disclosed that in the event of a frontal accident, when the engine and transmission of the vehicle are projected forward from the chassis into a relatively unmovable object, such as a stone wall or a heavier vehicle, the engine and transmission following destruction of their suspension will hit the relatively rigid front structure of the object or stronger vehicle, and will be pushed back by it and crash into the passenger compartment of the vehicle at a comparatively high speed. This reflection-like process stresses a weaker vehicle involved in a head-on collision, with simultaneous relief to a stronger vehicle, considerably more than would be the case if the vehicle had crashed at half of the collision speed into a rigid object. In addition, a weaker vehicle involved in a head-on collision is subjected to a considerable additional stress in that it is hit by the engine of the stronger vehicle and must intercept it.

It has consequently been determined that it is advisable to restrain this forward motion of the vehicle engine/transmission unit following release from the chassis of the vehicle. It is also desirable to deflect the forward motion of the engine toward the ground in order that its kinetic energy be dissipated in a direction which is not harmful to the passenger compartment of the vehicle and will not pose a hazard to its occupants.

There have been known in the prior art such structural designs for restraining the forward motion of a vehicle engine. German patent disclosure No. 2,241,651 discloses an engine mounting arrangement in which the engine and transmission unit is mounted by releasable mounts at the rear portion and is also affixed to a pivotable transverse structural member at the front end of the chassis. When a vehicle with such a mounting arrangement is involved in a frontal collision the engine and transmission unit is released from its rear mount and swivels about the forward transverse structural member in a downward direction toward the road. Accordingly, the penetration of the engine and transmission unit into the passenger compartment as the result of the collision is avoided. Such an arrangement requires that the transverse structural member have sufficient structural strength and rigidity to counteract the forward inertia of the engine and cause a swiveling effect resulting in a downward motion of the engine and transmission.

The problem with this prior art engine mounting arrangement is that the pivotable connections between the engine and the transverse supportant member at the front end of the engine constitute a vibration transmitting connection between the point of the engine/transmission unit having maximum amplitude of vibration and the automobile chassis. Consequently, engine vibrations are transmitted to the chassis with a high amplitude during normal operating conditions.

It is therefore an object of the present invention to provide a vehicle with a restraining means for a front engine in the event of a frontal collision, which means do not impair driving comfort by transmitting engine vibrations to the chassis.

SUMMARY OF THE INVENTION

In accordance with the present invention there is provided a motor vehicle having a chassis with frontal energy absorbing members and an engine unit attached to the chassis behind such energy absorbing members by releasable mounts. There is also provided means, attached to the chassis and arranged behind the energy absorbing members to enter into force transmitting connection with the engine unit only after release of the mounts on commencement of motion of the engine unit relative to the chassis in the direction of vehicle travel, for restraining the forward motion of the engine unit on the occurrence of a frontal collision.

In accordance with one embodiment of the invention the restraining means is a transverse structural member arranged a short distance in front of the engine and having no force transmitting members connecting the structural member and the engine. The transverse structural member may be arranged between longitudinal frame members of the vehicle.

For a better understanding of the present invention together with other and further objects thereof, reference is made to the following description taken in conjunction with the accompanying drawings and its scope will be pointed out in the appended claims.

DESCRIPTION OF THE INVENTION

Figure 1:
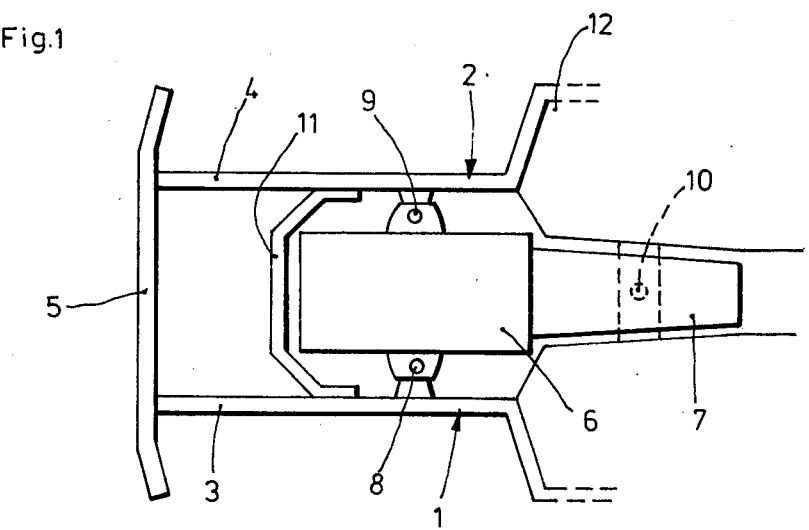
FIG. 1 is an illustration of a vehicle structure in accordance with the present invention.

FIG. 1 illustrates an engine mounting and chassis arrangement of a vehicle in accordance with the present invention. In order to highlight the features of the present invention details of the engine and body structure, such as wheels and steering apparatus are not shown in the drawing. The chassis structure of the vehicle illustrated in FIG. 1 includes longitudinal frame members 1 and 2. The front sections 3 and 4 of frame members 1 and 2 are attached to a transverse frame member 5, which may be the bumper of the vehicle. Front sections 3 and 4, together with transverse structural member 5 comprise energy absorbing members in the front section of the vehicle which absorb impact energy in the event of a frontal collision. In addition to these structural members, the entire front end of the vehicle, including the body contribute to energy absorption upon a frontal collision. Behind the energy absorbing arrangement comprising members 3, 4 and 5, there is located an engine 6 and its associated transmission 7 which form an engine/transmission unit.

In the embodiment of FIG. 1 the engine/transmission unit is attached to the chassis of the vehicle by mounts 8, 9 and 10. Mounts 8, 9 and 10 are designed to prevent the transmission of engine vibrations to the chassis of the vehicle. Such mounts are well known to those skilled in the art and also have the feature that in the event of a frontal collision with sufficient impact, the inertia of the engine/transmission unit will be sufficient to destroy mounts 8, 9 and 10, releasing the connection of the engine/transmission unit to the chassis.

In accordance with the present invention there is located between the energy absorbing members 3, 4 and 5 at the front end of the vehicle, and the engine/transmission unit, a transverse structural member 11 which serves as a means for restraining the forward motion of the engine after destruction and release of the engine mounts 8, 9 and 10.

Transverse member 11 is spaced a short distance in front of engine 6 so that during normal operation of the vehicle there is no force transmitting connection between transverse member 11 and engine 6. Vibrations of engine 6 are therefore not transmitted to the chassis of the vehicle by transverse member 11.

Transverse member 11 must be made sufficiently strong and connected to longitudinal members 1 and 2 with sufficient rigidty so that following the destruction and release of engine mounts 8, 9 and 10, structural member 11 prevents the engine/transmission unit from continuing in a forward direction and impacting the obstacle into which the vehicle has collided. By restraining the forward motion of the engine/transmission unit, the unit is prevented from being deflected off the obstacle into which the vehicle has collided and thus being driven back into the passenger compartment 12 of the vehicle and injuring its occupants.

While there have been described what are believed to be the preferred embodiments of the present invention, those skilled in the art will recognize that other and further modifications may be had thereto without departing from the true spirit and scope of the invention, and it is intended to cover all such embodiments which fall within the true scope of the invention.

It is an important feature of the invention that the restraining means are not designed to absorb energy as is the case in the device described in German patent disclosure (Offenlegungsschrift) No. 2,213,725. While the invention prevents a forward motion of the engine unit with respect to the chassis after release of the mounts, the known device needs such relative motion because otherwise it does not absorb energy. So while in a vehicle equipped with the invention the engine unit in case of a collision with a stronger vehicle is prevented from hitting the engine unit of the stronger car and being "reflected" therefrom towards the own passenger compartment, this happens with the known device. In one embodiment described in said Offenlegungsschrift during this "reflection" there also occurs energy absorbing, but the energy absorbing means are supported by the chassis and therefore this effect creates a highly unwanted further deceleration of the passenger compartment.

I claim:

1. A motor vehicle comprising:
    a chassis having frontal energy absorbing members;
    an engine unit;
    vibration-dampening, releasable mounts for attaching said engine unit to said chassis behind said energy absorbing members;
    and a rigid transverse chassis member arranged behind said energy absorbing members and a short distance in front of said engine unit to enter into force transmitting contact with said engine unit only after release of said mounts and commencement of motion of said engine unit relative to the chassis in the direction of vehicle travel, thereby restraining the forward motion of said engine unit with respect to said chassis on the occurrence of a frontal collision.

2. A vehicle as specified in claim 1 wherein said chassis includes longitudinal frame members and wherein said transverse member is rigidly connected between said longitudinal frame members.

* * * * *